US012609600B2

(12) United States Patent
Sreenivas et al.

(10) Patent No.: US 12,609,600 B2
(45) Date of Patent: Apr. 21, 2026

(54) METHOD AND APPARATUS FOR ESTIMATING VOLTAGE REGULATOR CURRENT

(71) Applicant: Infineon Technologies Austria AG, Villach (AT)

(72) Inventors: Venkat Sreenivas, Winchester, MA (US); Bikiran Goswami, Burlington, MA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 250 days.

(21) Appl. No.: 18/216,016

(22) Filed: Jun. 29, 2023

(65) Prior Publication Data

US 2025/0007382 A1     Jan. 2, 2025

(51) Int. Cl.
H02M 1/00 (2007.01)
H02M 3/156 (2006.01)

(52) U.S. Cl.
CPC ......... H02M 1/0009 (2021.05); H02M 3/156 (2013.01); H02M 1/0012 (2021.05)

(58) Field of Classification Search
CPC .................................................. H02M 1/0025
See application file for complete search history.

(56) References Cited

U.S. PATENT DOCUMENTS 9,941,795 B1 * 4/2018 Mayega ................ H02M 3/156
11,601,052 B2 3/2023 Sreenivas et al.

2008/0278123 A1 * 11/2008 Mehas ................ H02M 3/1588
323/266
2012/0194161 A1 * 8/2012 Latham, II ............ H02M 3/156
323/286
2015/0236595 A1 * 8/2015 Babazadeh ........... H02M 3/157
323/272
2017/0346397 A1 * 11/2017 Babazadeh ....... H02M 3/33592
2020/0036287 A1 * 1/2020 Peretz ................... H03F 3/2171
2021/0328509 A1 10/2021 Tseng et al.
2021/0336543 A1 * 10/2021 Sreenivas ........... H02M 1/0025
2024/0405670 A1 * 12/2024 Hague .................. H02M 1/081
2025/0150004 A1 * 5/2025 Xiao ................... H02M 1/0025

OTHER PUBLICATIONS

1 Extended European Search Report of Corresponding Application No. 24185181.5; Nov. 27, 2024; 9 Pgs.

* cited by examiner

*Primary Examiner* — Gustavo A Rosario-Benitez
(74) *Attorney, Agent, or Firm* — Cooper Legal Group LLC

(57) ABSTRACT

A method and apparatus for estimating inductor current is provided. According to some embodiments, a method comprises generating a predicted sensed current signal for sensed current in an inductor of a power converter based on a power converter operating parameter, receiving a sensed current signal generated based on current in the inductor, compensating the predicted sensed current signal based on the sensed current signal to generate a compensated sensed current signal, generating a predicted instantaneous current signal for instantaneous current in the inductor based on the power converter operating parameter, compensating the predicted instantaneous current signal based on the compensated sensed current signal to generate an estimated instantaneous current signal, and controlling the power converter based on the estimated instantaneous current signal.

20 Claims, 6 Drawing Sheets

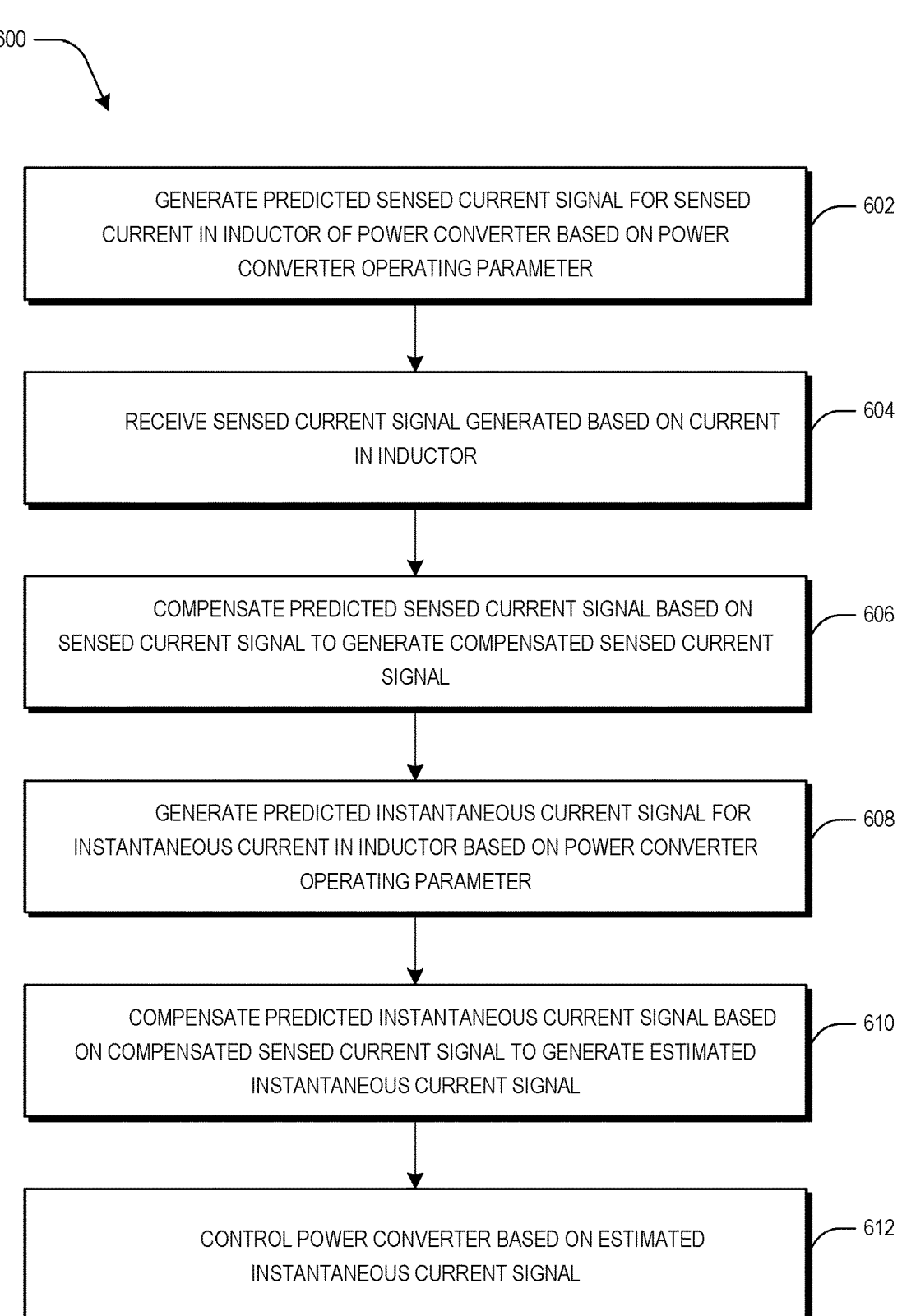

600

GENERATE PREDICTED SENSED CURRENT SIGNAL FOR SENSED CURRENT IN INDUCTOR OF POWER CONVERTER BASED ON POWER CONVERTER OPERATING PARAMETER — 602

RECEIVE SENSED CURRENT SIGNAL GENERATED BASED ON CURRENT IN INDUCTOR — 604

COMPENSATE PREDICTED SENSED CURRENT SIGNAL BASED ON SENSED CURRENT SIGNAL TO GENERATE COMPENSATED SENSED CURRENT SIGNAL — 606

GENERATE PREDICTED INSTANTANEOUS CURRENT SIGNAL FOR INSTANTANEOUS CURRENT IN INDUCTOR BASED ON POWER CONVERTER OPERATING PARAMETER — 608

COMPENSATE PREDICTED INSTANTANEOUS CURRENT SIGNAL BASED ON COMPENSATED SENSED CURRENT SIGNAL TO GENERATE ESTIMATED INSTANTANEOUS CURRENT SIGNAL — 610

CONTROL POWER CONVERTER BASED ON ESTIMATED INSTANTANEOUS CURRENT SIGNAL — 612

Fig. 6

METHOD AND APPARATUS FOR ESTIMATING VOLTAGE REGULATOR CURRENT

TECHNICAL FIELD

The present disclosure relates to the field of regulated power conversion.

BACKGROUND

Various types of devices may utilize electric power converters that convert one form of electric energy to another, such as by changing a voltage of the electric energy. Some electric power converters are configured to regulate an output voltage and/or an output current at an output.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a method comprises generating a predicted sensed current signal for sensed current in an inductor of a power converter based on a power converter operating parameter, receiving a sensed current signal generated based on current in the inductor, compensating the predicted sensed current signal based on the sensed current signal to generate a compensated sensed current signal, generating a predicted instantaneous current signal for instantaneous current in the inductor based on the power converter operating parameter, compensating the predicted instantaneous current signal based on the compensated sensed current signal to generate an estimated instantaneous current signal, and controlling the power converter based on the estimated instantaneous current signal.

According to some embodiments, a system comprises means for generating a predicted sensed current signal for sensed current in an inductor of a power converter based on a power converter operating parameter, means for receiving a sensed current signal generated based on current in the inductor, means for compensating the predicted sensed current signal based on the sensed current signal to generate a compensated sensed current signal, means for generating a predicted instantaneous current signal for instantaneous current in the inductor based on the power converter operating parameter, means for compensating the predicted instantaneous current signal based on the compensated sensed current signal to generate an estimated instantaneous current signal, and means for controlling the power converter based on the estimated instantaneous current signal.

According to some embodiments, a system, comprises a power converter comprises an inductor connected between an input and an output and configured to generate an output voltage at the output based on a power converter operating parameter, a first modelling unit configured to generate a predicted sensed current signal for current in the inductor based on the power converter operating parameter, a current sensor configured to measure the current in the inductor to generate a sensed current signal, a first controller configured to compensate the predicted sensed current signal based on the sensed current signal to generate a compensated sensed current signal, a second modeling unit configured to generate a predicted instantaneous current signal for idealized current in the inductor based on the power converter operating parameter, and a second controller configured to compensate the predicted instantaneous current signal based on the compensated sensed current signal to generate an estimated instantaneous current signal, wherein the power converter is configured to change the power converter operating parameter based on the estimated instantaneous current signal.

According to some embodiments, a computer-readable storage medium comprises computer-executable instructions which, when executed via a processing unit on a computer, perform a method for controlling a power converter tool, comprising generating a predicted sensed current signal for an inductor of a power converter based on a power converter operating parameter, receiving a sensed current signal generated based on current in the inductor, compensating the predicted sensed current signal based on the sensed current signal to generate a compensated sensed current signal, generating a predicted instantaneous current signal for idealized current in the inductor based on the power converter operating parameter, compensating the predicted instantaneous current signal based on the compensated sensed current signal to generate an estimated instantaneous current signal, and controlling the power converter based on the estimated instantaneous current signal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 6 is an illustration of an example method for estimating inductor current, according to some embodiments.

DETAILED DESCRIPTION

Figure 1:
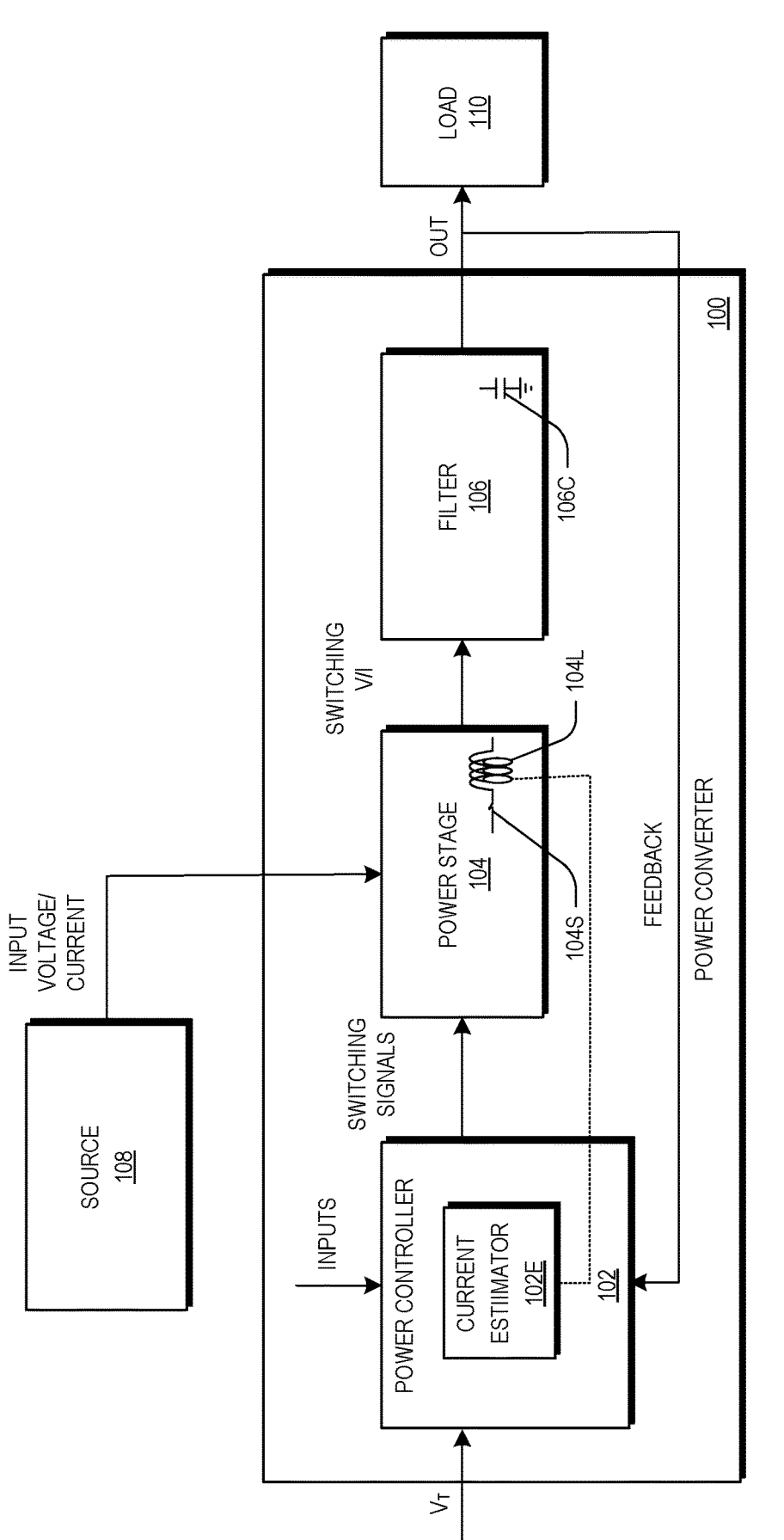
FIG. 1 is a component block diagram of a power converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

The term "power converter" as used herein broadly refers to any type of power converter or voltage regulator (VR) that provides one or more regulated voltages to one or more electronic loads such as an Ethernet switch, an Ethernet router, an ASIC (application-specification integrated circuit), a memory device, a processor such as a central processing unit (CPU), a microprocessor, a graphics processing unit (GPU), a digital signal processor (DSP), an artificial intelligence (AI) accelerator, an image processor, a network or packet processor, a coprocessor, a multi-core processor, a front-end processor, a baseband processor, a field programmable gate array (FPGA), a lighting element, a power tool, a vehicle, a motor, or some other suitable load. For example, the power converter may be a buck converter, a boost converter, a buck-boost converter, a switched capacitor voltage regulator, a step-down converter, a two inductor, two capacitor (CLLC) converter, a resonant converter, etc.

The term "power converter" as used herein means a functional assembly, such as a packaged functional assembly, that includes a power stage with a switching circuit used in converting a voltage from one level to another level, e.g., as in power conversion and voltage regulation. The power converter may include a power controller for driving the power stage. The power controller is configured to control the power stage to reduce a voltage error of the output voltage, such as a difference between the output voltage and a target voltage, or to control a current error of the output current, such as a difference between the output current and a target current. Described next in more detail are various embodiments of the power converter, a method of controlling the power converter, and an electronic system that includes the power converter.

In some embodiments, the power converter estimates inductor current and generates an alert or modifies one or more power converter operating parameters based on the estimated inductor current. The power converter estimates inductor current using measured current and modeled current. Control loops are used to compensate the modeled current based on the measured current. In some embodiments, a first modeling unit generates a first predicted current signal for current in the inductor that is similar in shape to the measured current signal and a second modeling unit generates a second predicted current signal for idealized current in the inductor. The first predicted current signal is compensated based on the measured current signal to generate a first compensated current signal, and the second predicted current signal is compensated based on the first compensated current signal to generate a second compensated current signal. The power regulator is controlled based on the second compensated current signal.

FIG. 1 illustrates a power converter 100 according to some embodiments. The power converter 100 comprises a power controller 102, a power stage 104, and a filter 106. The power controller 102 receives a target voltage parameter, $V_T$, and controls the power stage 104 to convert electrical energy from a source 108 to generate an output signal, OUT, for the load 110. The output signal may be an output voltage, $V_{OUT}$, an output current, $I_{OUT}$, or both. The power stage 104 includes a switch 104S and an inductor 104L to store energy. The filter 106 includes one or more filtering components to smooth the output of the power stage 104 to generate the output signal. For example, the filter 106 includes a capacitor 106C.

The source 108 provides an input current, $I_{IN}$ and an input voltage, VIN to the terminals of the power stage 104. In some embodiments, the power controller 102 employs a buck topology, where the voltage of the source 108 is greater than the target voltage, $V_T$. Other topologies, such as boost or buck-boost may be used. The power controller 102 employs the target voltage, $V_T$, and a feedback signal representative of the output signal, OUT, and generates a control signal that is modulated (e.g., pulse width modulated (PWM) or pulse frequency modulated (PFM)) to generate switching signals for the switch 104S in the power stage 104 to store energy in the inductor 104L. In some embodiments, the power controller 102 collects information from the power stage 104 and the output and monitors the states of the systems. In some embodiments, the power controller 102 comprises a current estimator 102E that estimates current in the inductor 104L to identify issues, modify power converter operating parameters, issue warnings, or shut down the power converter 100 in case of error conditions, such as overcurrent. The power controller 102 may provide a communication to the outside world such as for telemetry.

The power controller 102 comprises complex control systems employing different control schemes along with side band control structures to achieve a desirable static/dynamic response, such as limiting the output voltage overshoot and undershoot, maintaining phase current balance and proper interleaving, and/or ensuring proper startup/shutdown behavior. To provide this control, the power controller 102 needs to know the output voltage and phase currents in a timely manner. Inductor currents are measured to ensure that the currents stay within programmed constraints to avoid undesirable events such as inductor saturation. Measured inductor current is generally not suitable for effective inductor current control. To facilitate effective inductor current control, the current estimator 102E uses modeled inductor current and measured inductor current to generate an estimate of idealized instantaneous inductor current.

In some embodiments, the switch 104S in the power stage 104 comprises one or more switching transistors, such as metal-oxide-semiconductor field effect transistors (MOSFETs). The power stage 104 may comprise high side switches and/or low side switches, collectively represented by the switch 104S, and the inductor 104L through which current is output to the filter 106. Controlled switching of the switch 104S results in generation of the output voltage and/or the output current. The switching voltage of the power stage 104 is the voltage between ground and the node connected to the primary side of the inductor 104L, the drain of the low side MOSFET and the source of the high side MOSFET. In some embodiments, the switching voltage is a voltage oscillating at a high frequency in a substantially square form between 0V and the input voltage, VIN. The power stage 104 may include multiple phases, typically switching out of phase with one another to reduce ripple.

Figure 2:
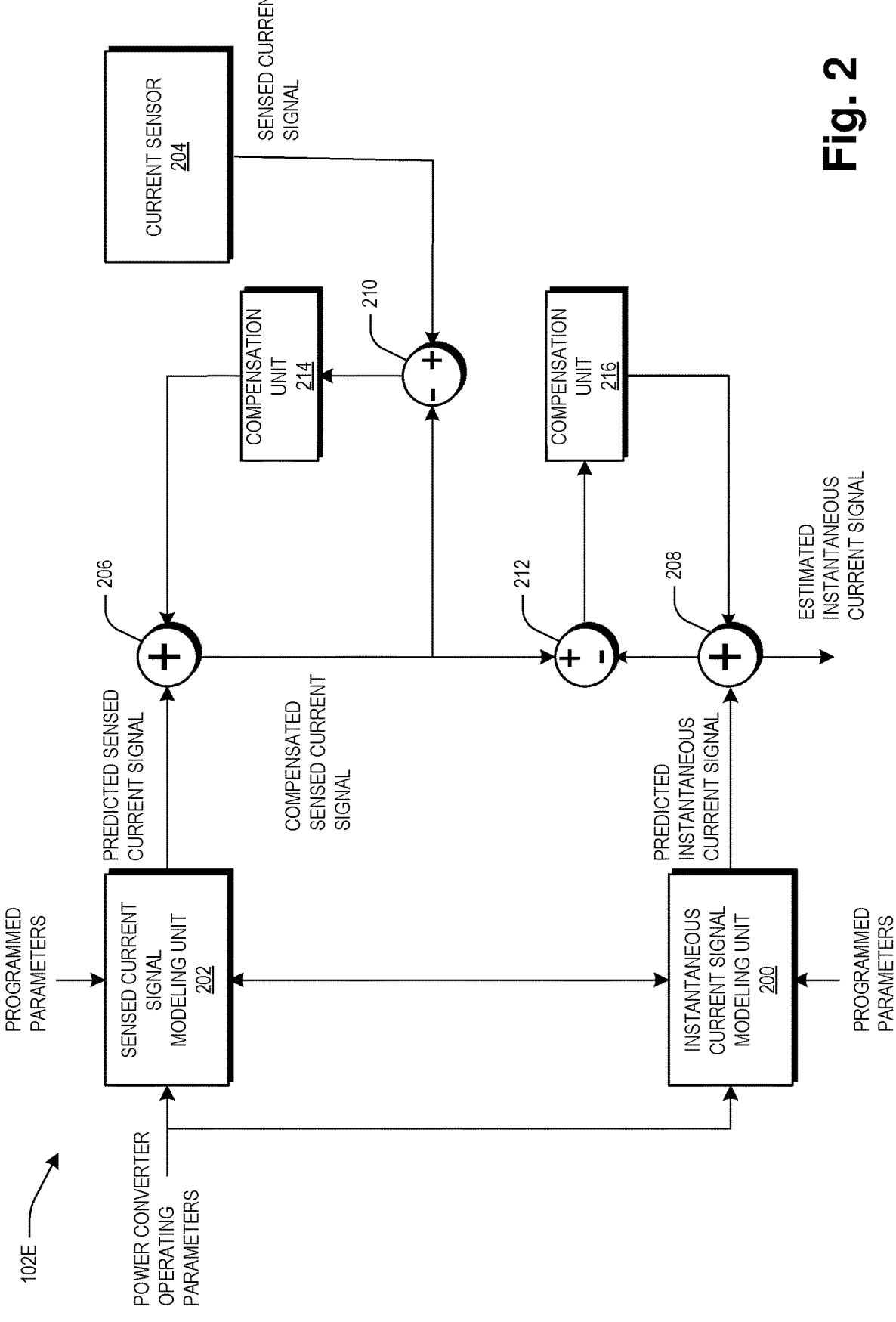
FIGS. 2 and 3 are block diagrams illustrating a current estimator, according to some embodiments.
Figure 3:
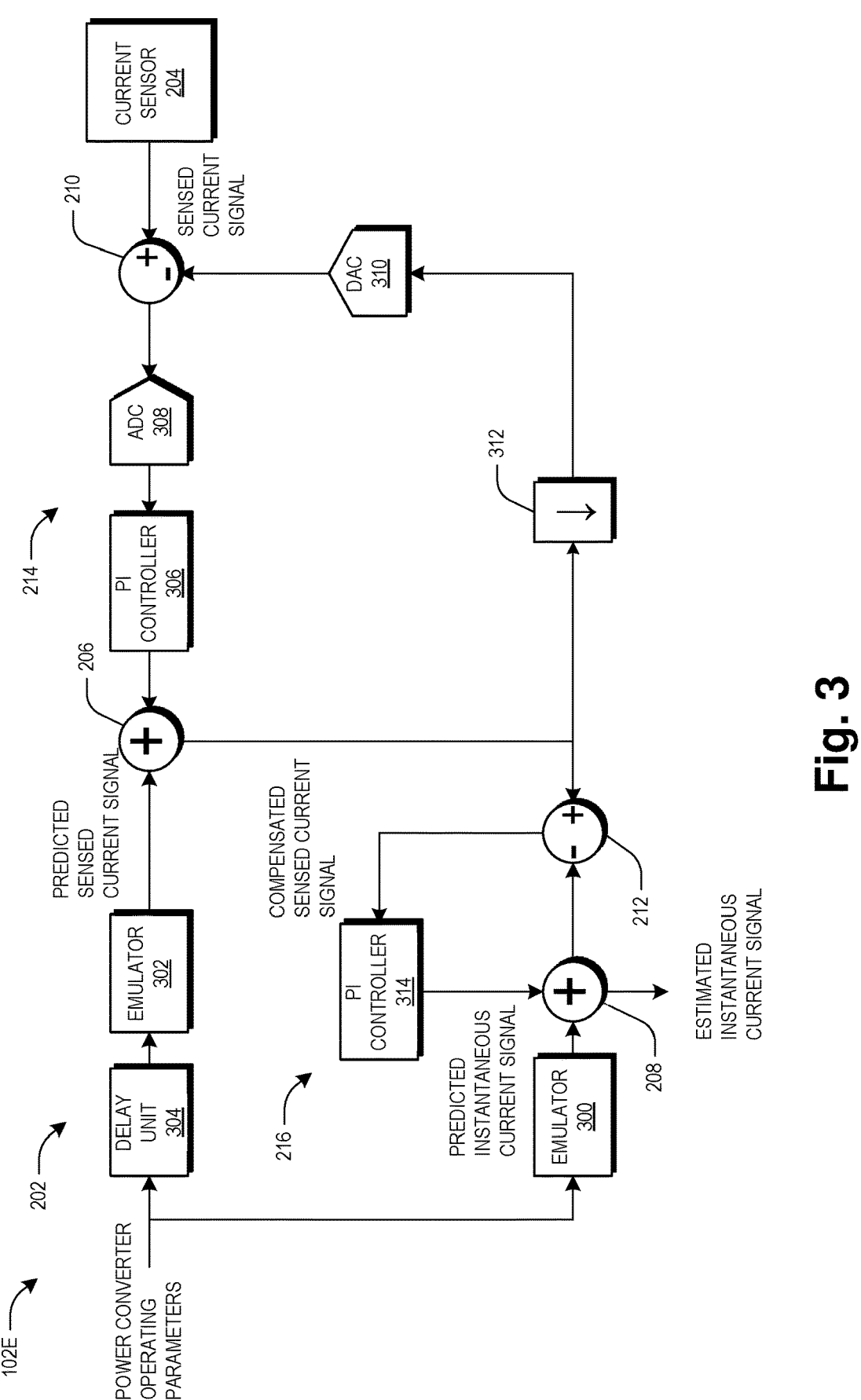

FIGS. 2 and 3 are block diagrams illustrating the current estimator 102E, according to some embodiments. FIG. 2 is a component block diagram and FIG. 3 is a mixed signal block diagram. The current estimator 102E comprises an instantaneous current signal modeling unit 200, a sensed current signal modeling unit 202, a current sensor 204, adders 206, 208, compare units 210, 212, and compensation units 214, 216.

The current sensor 204 generates a sensed current signal by measuring current in the inductor 104L. The sensed current signal sensed by the current sensor 204 differs from the actual current in the inductor 104L due to irregularities introduced by the sensing itself, such as delay, noise, filtering effects, bandwidth limiting, etc. The sensed current signal modeling unit 202 models these irregularities to generate a predicted sensed current signal based on the power converter operating parameters, such as voltage, pulse width modulation (PWM) duty cycle, switching frequency, number of stages, stage interleaving timing, etc., characteristics of the current sensor 204, and design characteristics of the power converter 100, such as inductor inductance and/or some other design characteristic. The instantaneous current signal modeling unit 200 generates a predicted instantaneous current signal representing the current signal expected in the inductor 104L without the sensing irregularities, essentially an idealized current signal.

In some embodiments, the current estimator 102E compensates the predicted sensed current signal based on the sensed current signal. The compensation unit 214 generates an adjustment factor for the predicted sensed current signal to reduce the difference between the sensed current signal and the predicted sensed current signal to generate a compensated sensed current signal. Initially, the compensated sensed current signal matches the predicted sensed current signal. The compare unit 210 compares the sensed current signal to the compensated sensed current signal, e.g., by generating a difference between the sensed current signal and the compensated sensed current signal. The output of the compare unit 210 is provided to the compensation unit 214, which generates an adjustment factor for compensating the predicted sensed current signal. The adjustment factor is provided to the adder 206 and combined with the predicted sensed current signal to generate the compensated sensed current signal.

In some embodiments, the current estimator 102E compensates the predicted instantaneous current signal based on the compensated sensed current signal. The compensation unit 216 generates an adjustment factor for the predicted instantaneous current signal to reduce the difference between the predicted instantaneous current signal and the compensated sensed current signal to generate an estimated instantaneous current signal. Initially, the estimated instantaneous current signal matches the predicted instantaneous current signal. The compare unit 212 compares the compensated sensed current signal to the estimated instantaneous current signal, e.g., by generating a difference between the compensated sensed current signal and the estimated instantaneous current signal. The output of the compare unit 212 is provided to the compensation unit 216, which generates an adjustment factor for compensating the predicted instantaneous current signal. The adjustment factor is provided to the 208 and combined with the predicted instantaneous current signal to generate the estimated instantaneous current signal.

FIG. 3 illustrates a block diagram of a mixed signal embodiment of the current estimator 102E, according to some embodiments. The instantaneous current signal modeling unit 200 may comprise an emulator 300, and the sensed current signal modeling unit 202 may comprise an emulator 302 and a delay unit 304. The emulators 300, 302 may include look-up tables indexed based on the power converter operating parameters. The delay unit 304 simulates the delay between when a change is made in a power converting operating parameter and the when change is evident in the measured signal.

The compensation unit 214 may comprise a proportional integral (PI) controller 306, an analog-to-digital converter (ADC) 308 that converts the analog output of the current sensor 204 to a digital signal, a digital-to-analog converter (DAC) 310 that converts the digital compensated sensed current signal to an analog signal, and a down sampling unit 312 that reduces the data frequency from the frequency used by the emulators 300, 302 (e.g., 100 MHz) to the frequency used by the DAC 308 (e.g., 25 MHz). In some embodiments, the compare unit 210 is an analog device, such as an amplifier. The PI controller 306 implements a control loop that adjusts the predicted sensed current signal using feedback from the sensed current signal to generate the compensated sensed current signal. The compensation unit 216 may comprise a PI controller 314 that implements a control loop that adjusts the predicted instantaneous current signal using feedback from the compensated sensed current signal to generate the estimated instantaneous current signal.

Figure 4:
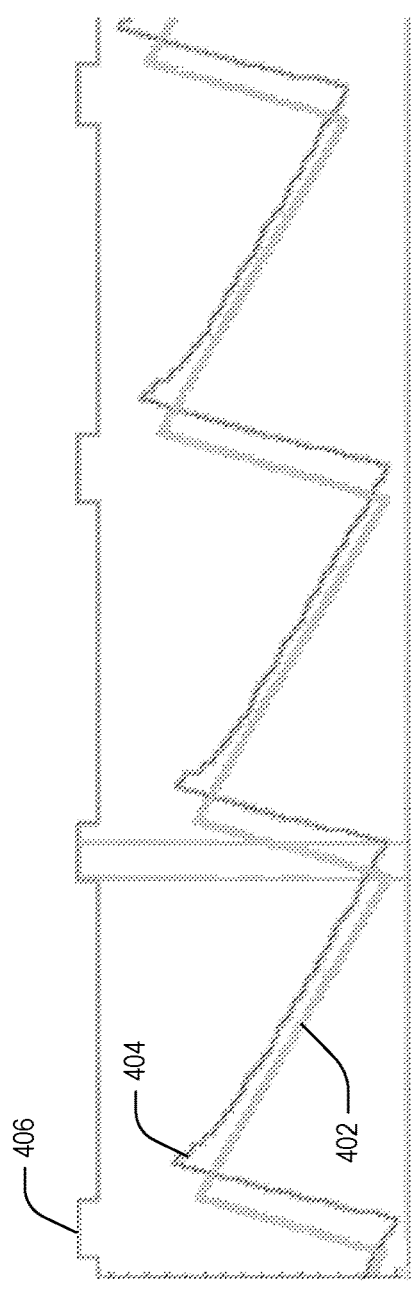
FIGS. 4 and 5 are diagrams illustrating example sensed current signals and resulting estimated instantaneous current signals, according to some embodiments
Figure 5:
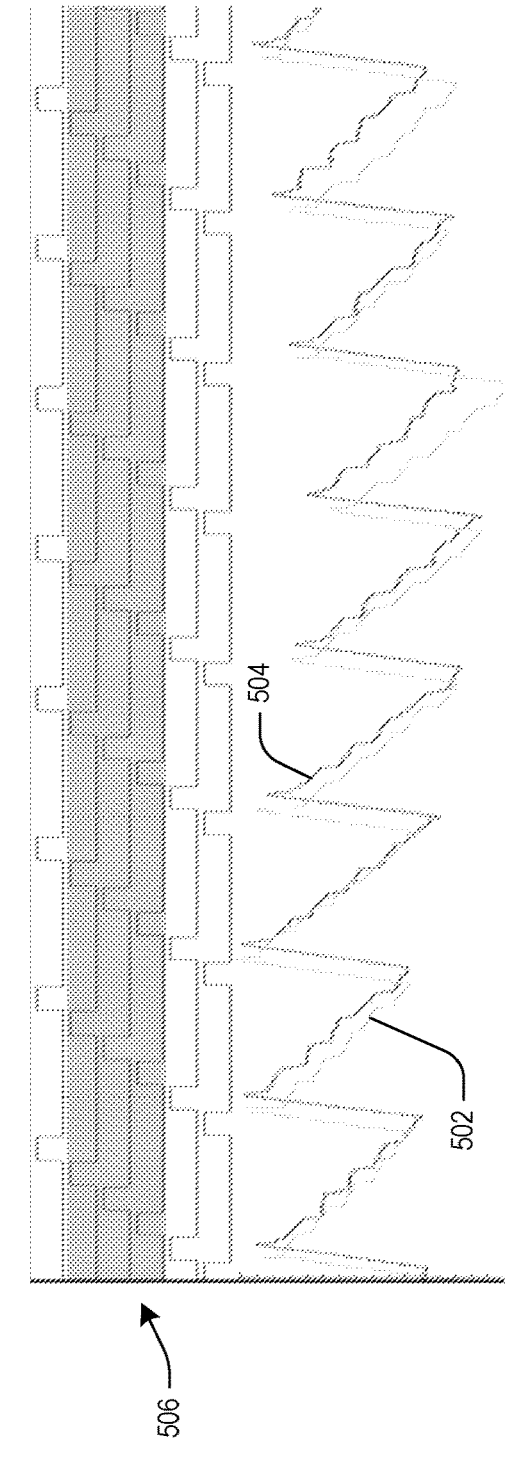

FIGS. 4 and 5 are diagrams illustrating example sensed current signals and resulting estimated instantaneous current signals according to some embodiments. FIG. 4 illustrates a sensed current signal 402 and an estimated instantaneous current signal 404 generated by the current estimator 102E for a one phase power converter based on a PWM signal 406 (e.g., power converter operating parameter). Note that a transition in the estimated instantaneous current signal 404 corresponds in time with a transition in the PWM signal 406, but the sensed current signal 402 is delayed and also includes irregularities.

FIG. 5 illustrates a sensed current signal 502 and an estimated instantaneous current signal 504 generated by the current estimator 102E for a six phase Trans-Inductor Voltage Regulator (TLVR) based on PWM signals 506 (e.g., power converter operating parameter). Again, transitions in the estimated instantaneous current signal 504 correspond in time with transitions in the PWM signals 506, but the sensed current signal 502 is delayed and also includes irregularities.

In some embodiments, the power controller 102 uses the estimated instantaneous current signal to control the power converter 100 and/or to identify fault conditions. For example, in a control scheme that controls inductor current, the power controller 102 may change power converter operating parameters, such as the PWM duty cycle, to control the inductor current. In some embodiments, the power controller 102 may limit inductor current and change the power converter operating parameters responsive to the inductor current exceeding a limit. Such limiting may be temporary until load and resulting inductor current falls below the limit.

In some embodiments, the power controller 102 may generate alert flags based on the estimated instantaneous current (EIC) signal exceeding current thresholds:

$$Alert1 = EIC(T) > S_{T1}$$

$$Alert2 = EIC(T) > S_{T2},$$

where the first alert flag represents a warning condition and the second alert flag represents an action condition. The power controller 102 may set the alert flags in a specific memory location and/or send a message to an external device indicating a current warning condition. In some embodiments, the power controller 102 applies a dead time period to the fault condition detection. For example, the power controller 102 may identify a first fault condition based on Alert1 and/or a second fault condition based on Alert2 only after the threshold has been violated for a particular time period, such as 1 microsecond, 2 microseconds, 3 microseconds, or some other suitable time period. In some embodiments, the dead time period for the Alert1 flag may differ than the dead time period for the Alert2 flag. A dead time interval avoids fault messages or actions for a steep, single load jump resulting in a fast increase of the load current or a load release resulting in a fast decrease of the load current, which may result in spikes or drops in the output voltage.

In some embodiments, responsive to the first alert threshold (Alert1) being violated, the power controller 102 generates a fault message identifying the first fault condition, such as an indicator light, a message on a user interface, a message communicated over a communication interface, or some other form of alert communication indicating that EIC has exceeded the first alert threshold.

In some embodiments, responsive to the second alert threshold (Alert2) being violated, the power controller 102 identifies the second fault condition and initiates a protective action to reduce inductor current. In some embodiments, the power controller 102 may reduce inductor current by changing one or more of the power converter operating parameters. In some embodiments, the power controller 102 inhibits the generation of the switching signals for the power stage 104, such as by grounding the switching signals.

In some embodiments, the power controller 102 clears the fault condition responsive to the EIC being less than a reset threshold for a predetermined time period.

FIG. 6 illustrates a method 600 for controlling a power converter 100, according to some embodiments. At 602, a predicted sensed current signal for sensed current in an inductor 104L of a power converter is generated based on a power converter operating parameter. At 604, a sensed current signal generated based on current in the inductor 104L is received. At 606, the predicted sensed current signal is compensated based on the sensed current signal to generate a compensated sensed current signal. At 608, a predicted instantaneous current signal for instantaneous current in the inductor 104L is generated based on the power converter operating parameter. At 610, the predicted instantaneous current signal is compensated based on the compensated sensed current signal to generate an estimated instantaneous current signal. At 612, the power converter 100 is controlled based on the estimated instantaneous current signal.

Figure 7:
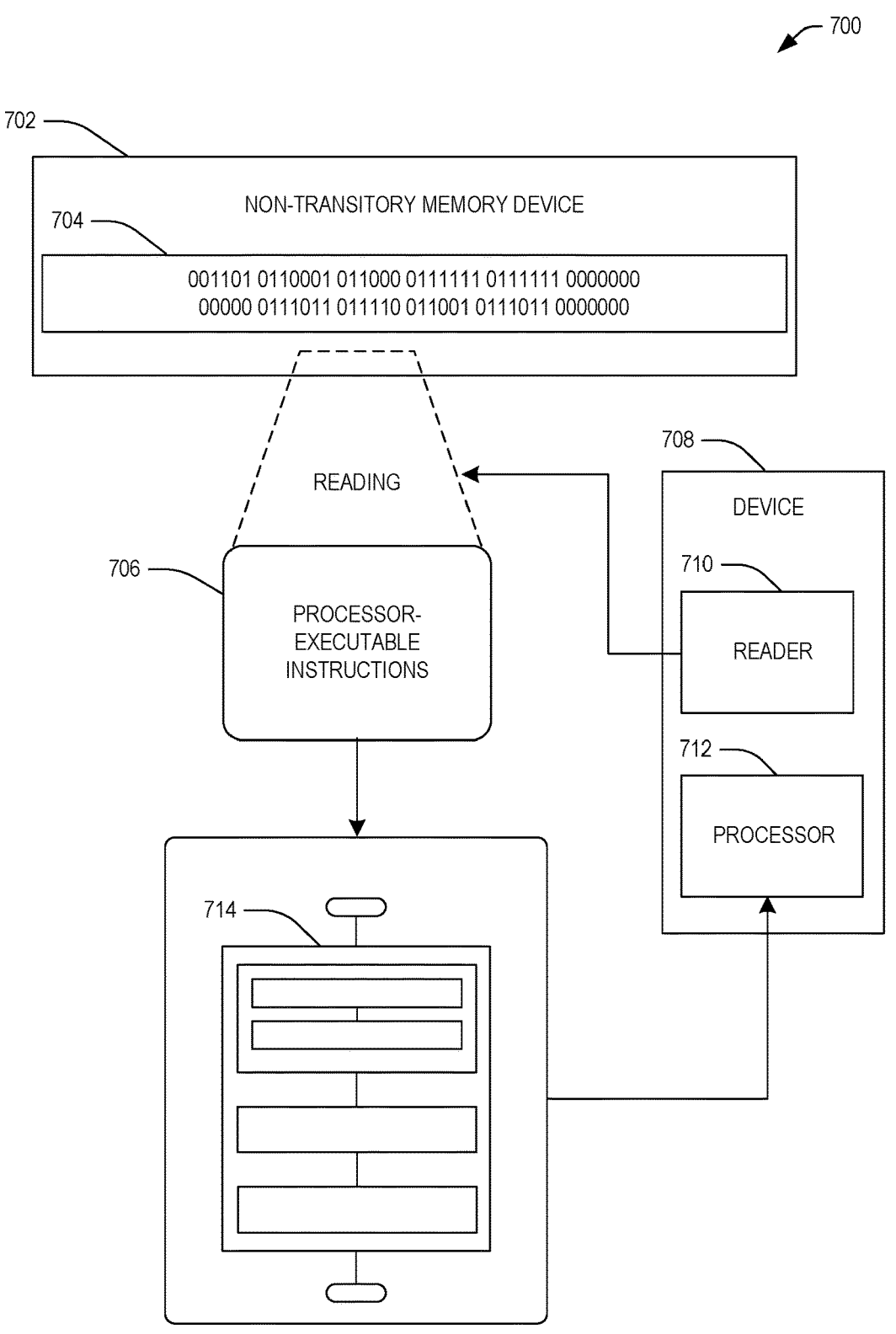
FIG. 7 illustrates a computer-readable medium, according to some embodiments.

FIG. 7 illustrates an embodiment 700 of a computer-readable medium 702, according to some embodiments. One or more embodiments involve a computer-readable medium comprising processor-executable instructions configured to implement one or more of the techniques presented herein. The embodiment 700 comprises a non-transitory computer-readable medium 702 (e.g., a CD-R, DVD-R, flash drive, a platter of a hard disk drive, etc.), on which is encoded computer-readable data 704. This computer-readable data 704 in turn comprises a set of processor-executable computer instructions 706 that, when executed by a computing device 708 including a reader 710 for reading the processor-executable computer instructions 706 and a processor 712 for executing the processor-executable computer instructions 706, are configured to facilitate operations according to one or more of the principles set forth herein. In some embodiments, the processor-executable computer instructions 706, when executed, are configured to facilitate performance of a method 714, such as at least some of the aforementioned method(s). In some embodiments, the processor-executable computer instructions 706, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

According to some embodiments, a method comprises generating a predicted sensed current signal for sensed current in an inductor of a power converter based on a power converter operating parameter, receiving a sensed current signal generated based on current in the inductor, compensating the predicted sensed current signal based on the sensed current signal to generate a compensated sensed current signal, generating a predicted instantaneous current signal for instantaneous current in the inductor based on the power converter operating parameter, compensating the predicted instantaneous current signal based on the compensated sensed current signal to generate an estimated instantaneous current signal, and controlling the power converter based on the estimated instantaneous current signal.

According to some embodiments, compensating the predicted sensed current signal comprises compensating the predicted sensed current signal to reduce a difference between the predicted sensed current signal and the sensed current signal.

According to some embodiments, compensating the predicted sensed current signal to reduce the difference between the predicted sensed current signal and the sensed current signal comprises compensating the predicted sensed current signal using a proportional integral controller.

According to some embodiments, compensating the predicted instantaneous current signal comprises compensating the predicted instantaneous current signal to reduce a difference between the estimated instantaneous current signal and the compensated sensed current signal sensed at a valley region of the predicted instantaneous current signal.

According to some embodiments, compensating the predicted instantaneous current signal to reduce the difference between the estimated instantaneous current signal and the compensated sensed current signal comprises compensating the predicted instantaneous current signal using a proportional integral controller.

According to some embodiments, generating the predicted sensed current signal comprises generating the predicted sensed current signal using a first look-up table indexed by the power converter operating parameter, and generating the predicted instantaneous current signal comprises generating the predicted instantaneous current signal using a second look-up table indexed by the power converter operating parameter.

According to some embodiments, generating the predicted sensed current signal comprises generating a delay in the predicted sensed current signal relative to the predicted instantaneous current signal.

According to some embodiments, controlling the power converter based on the estimated instantaneous current signal comprises controlling current in the power converter based on the estimated instantaneous current signal.

According to some embodiments, controlling the power converter based on the estimated instantaneous current signal comprises disabling the power converter based on the estimated instantaneous current signal.

According to some embodiments, a system, comprises a power converter comprises an inductor connected between an input and an output and configured to generate an output voltage at the output based on a power converter operating parameter, a first modelling unit configured to generate a predicted sensed current signal for current in the inductor based on the power converter operating parameter, a current sensor configured to measure the current in the inductor to generate a sensed current signal, a first controller configured to compensate the predicted sensed current signal based on the sensed current signal to generate a compensated sensed current signal, a second modeling unit configured to generate a predicted instantaneous current signal for idealized current in the inductor based on the power converter operating parameter, and a second controller configured to compensate the predicted instantaneous current signal based on the compensated sensed current signal to generate an estimated instantaneous current signal, wherein the power converter is configured to change the power converter operating parameter based on the estimated instantaneous current signal.

According to some embodiments, the first controller is configured to compensate the predicted sensed current signal to reduce a difference between the predicted sensed current signal and the sensed current signal, and the second controller is configured to compensate the predicted instantaneous current signal to reduce a difference between the predicted instantaneous current signal and the compensated sensed current signal at a valley region of the predicted instantaneous current signal.

According to some embodiments, at least one of the first controller or the second controller comprises a proportional integral controller.

According to some embodiments, at least one of the first modeling unit or the second modeling unit comprises a look-up table indexed by the power converter operating parameter.

According to some embodiments, the power converter is configured to change the power converter operating parameter to limit current in the power converter.

According to some embodiments, the power converter is configured to change the power converter operating parameter to disable the power converter.

According to some embodiments, a computer-readable storage medium comprises computer-executable instructions which, when executed via a processing unit on a computer, perform a method for controlling a power converter tool, comprising generating a predicted sensed current signal for an inductor of a power converter based on a power converter operating parameter, receiving a sensed current signal generated based on current in the inductor, compensating the predicted sensed current signal based on the sensed current signal to generate a compensated sensed current signal, generating a predicted instantaneous current signal for idealized current in the inductor based on the power converter operating parameter, compensating the predicted instantaneous current signal based on the compensated sensed current signal to generate an estimated instantaneous current signal, and controlling the power converter based on the estimated instantaneous current signal.

According to some embodiments, compensating the predicted sensed current signal comprises compensating the predicted sensed current signal to reduce a difference between the predicted sensed current signal and the sensed current signal.

According to some embodiments, compensating the predicted instantaneous current signal comprises compensating the predicted instantaneous current signal to reduce a difference between the predicted instantaneous current signal and the compensated sensed current signal.

According to some embodiments, at least one of generating the predicted sensed current signal or generating the predicted instantaneous current signal comprises accessing a look-up table indexed by the power converter operating parameter.

According to some embodiments, controlling the power converter based on the estimated instantaneous current signal comprises at least one of controlling current in the power converter or disabling the power converter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A method, comprising:
generating a predicted sensed current signal for sensed current in an inductor of a power converter based on a power converter operating parameter and modeled sensing irregularities;
receiving a sensed current signal generated based on current in the inductor;
compensating, in a first controller, the predicted sensed current signal based on the sensed current signal to generate a compensated sensed current signal;
generating a predicted instantaneous current signal for instantaneous current in the inductor based on the power converter operating parameter;
compensating, in a second controller, the predicted instantaneous current signal based on the compensated sensed current signal generated by the first controller to generate an estimated instantaneous current signal; and
controlling the power converter based on the estimated instantaneous current signal.

2. The method of claim 1, wherein compensating, in the first controller, the predicted sensed current signal comprises:
compensating, in the first controller, the predicted sensed current signal to reduce a difference between the predicted sensed current signal and the sensed current signal.

3. The method of claim 2, wherein compensating, in the first controller, the predicted sensed current signal to reduce the difference between the predicted sensed current signal and the sensed current signal comprises:
compensating, in the first controller, the predicted sensed current signal using a proportional integral controller.

4. The method of claim 1, wherein compensating, in the second controller, the predicted instantaneous current signal comprises:
compensating, in the second controller, the predicted instantaneous current signal to reduce a difference between the estimated instantaneous current signal and the compensated sensed current signal sensed at a valley region of the predicted instantaneous current signal.

5. The method of claim 4, wherein compensating, in the second controller, the predicted instantaneous current signal to reduce the difference between the estimated instantaneous current signal and the compensated sensed current signal comprises:
compensating, in the second controller, the predicted instantaneous current signal using a proportional integral controller.

6. The method of claim 1, wherein:
generating the predicted sensed current signal comprises:
generating the predicted sensed current signal using a first look-up table indexed by the power converter operating parameter, and
generating the predicted instantaneous current signal comprises:
generating the predicted instantaneous current signal using a second look-up table indexed by the power converter operating parameter.

7. The method of claim 1, wherein:
generating the predicted sensed current signal comprises:
generating a delay in the predicted sensed current signal relative to the predicted instantaneous current signal.

8. The method of claim 1, wherein controlling the power converter based on the estimated instantaneous current signal comprises:
controlling current in the power converter based on the estimated instantaneous current signal.

9. The method of claim 1, wherein controlling the power converter based on the estimated instantaneous current signal comprises:
disabling the power converter based on the estimated instantaneous current signal.

10. A system, comprising:
a power converter comprising an inductor connected between an input and an output and configured to generate an output voltage at the output based on a power converter operating parameter;
a first modelling unit configured to generate a predicted sensed current signal for current in the inductor based on the power converter operating parameter and modeled sensing irregularities;
a current sensor configured to measure the current in the inductor to generate a sensed current signal;
a first controller configured to compensate the predicted sensed current signal based on the sensed current signal to generate a compensated sensed current signal;
a second modeling unit configured to generate a predicted instantaneous current signal for idealized current in the inductor based on the power converter operating parameter; and
a second controller configured to compensate the predicted instantaneous current signal based on the compensated sensed current signal generated by the first controller to generate an estimated instantaneous current signal, wherein:
the power converter is configured to change the power converter operating parameter based on the estimated instantaneous current signal.

11. The system of claim 10, wherein:
the first controller is configured to compensate the predicted sensed current signal to reduce a difference between the predicted sensed current signal and the sensed current signal, and

13 the second controller is configured to compensate the predicted instantaneous current signal to reduce a difference between the predicted instantaneous current signal and the compensated sensed current signal at a valley region of the predicted instantaneous current signal.

12. The system of claim 10, wherein:

at least one of the first controller or the second controller comprises a proportional integral controller.

13. The system of claim 10, wherein:

at least one of the first modeling unit or the second modeling unit comprises a look-up table indexed by the power converter operating parameter.

14. The system of claim 10, wherein:

the power converter is configured to change the power converter operating parameter to limit current in the power converter.

15. The system of claim 10, wherein:

the power converter is configured to change the power converter operating parameter to disable the power converter.

16. A non-transitory computer-readable storage medium comprising computer-executable instructions which, when executed via a processing unit on a computer, perform a method for controlling a power converter tool, comprising:

generating a predicted sensed current signal for an inductor of a power converter based on a power converter operating parameter and modeled sensing irregularities;

receiving a sensed current signal generated based on current in the inductor;

compensating, in a first controller, the predicted sensed current signal based on the sensed current signal to generate a compensated sensed current signal;

generating a predicted instantaneous current signal for idealized current in the inductor based on the power converter operating parameter;

14 compensating, in a second controller, the predicted instantaneous current signal based on the compensated sensed current signal generated via the first controller to generate an estimated instantaneous current signal; and controlling the power converter based on the estimated instantaneous current signal.

17. The non-transitory computer-readable storage medium of claim 16, wherein:

compensating, in the first controller, the predicted sensed current signal comprises:

compensating, in the first controller, the predicted sensed current signal to reduce a difference between the predicted sensed current signal and the sensed current signal.

18. The non-transitory computer-readable storage medium of claim 16, wherein:

compensating, in the second controller, the predicted instantaneous current signal comprises:

compensating, in the second controller, the predicted instantaneous current signal to reduce a difference between the estimated instantaneous current signal and the compensated sensed current signal.

19. The non-transitory computer-readable storage medium of claim 16, wherein:

at least one of generating the predicted sensed current signal or generating the predicted instantaneous current signal comprises:

accessing a look-up table indexed by the power converter operating parameter.

20. The non-transitory computer-readable storage medium of claim 16, wherein:

controlling the power converter based on the estimated instantaneous current signal comprises:

at least one of controlling current in the power converter or disabling the power converter.

* * * * *